United States Patent [19]

Schure et al.

[11] 4,388,426
[45] Jun. 14, 1983

[54] STABILIZATION OF EPOXY SYSTEMS IN NON-FLAMMABLE SOLVENTS

[75] Inventors: Ralph M. Schure, Darien; Gerald H. Steele, Lisle, both of Ill.

[73] Assignee: Eschem Inc., Chicago, Ill.

[21] Appl. No.: 277,903

[22] Filed: Jun. 26, 1981

[51] Int. Cl.$^3$ .................. C08G 69/48; C08G 59/18; C08L 63/02; C08K 5/02
[52] U.S. Cl. ................... 523/462; 523/400; 523/428; 525/423; 525/939
[58] Field of Search ............. 523/427, 428, 417, 462, 523/400; 525/420.5, 423, 939

[56] References Cited

U.S. PATENT DOCUMENTS

| | | | |
|---|---|---|---|
| 2,068,607 | 1/1937 | Olin | 23/250 |
| 2,096,735 | 10/1937 | Dinley | 87/5 |
| 2,096,737 | 10/1937 | Dinley | 87/5 |
| 2,683,093 | 7/1954 | Eberl | 106/311 |
| 3,251,708 | 5/1966 | Schmetterer et al. | 523/462 |
| 3,291,745 | 12/1966 | Martens | 252/171 |
| 3,335,088 | 8/1967 | Mandell | 252/143 |
| 3,335,105 | 8/1967 | Burnthall et al. | 523/417 |
| 3,399,162 | 8/1968 | Salame | 523/462 |
| 3,449,280 | 6/1969 | Frigstad | 523/417 |
| 3,496,241 | 2/1970 | Berkowitz | 260/652 J |
| 4,128,525 | 12/1978 | Yeakey et al. | 525/423 |
| 4,246,148 | 1/1981 | Shimp et al. | 525/939 |

FOREIGN PATENT DOCUMENTS 51-28199 3/1976 Japan .
864357 4/1961 United Kingdom .
990499 4/1965 United Kingdom .

OTHER PUBLICATIONS

Derwent Abst. 07929U/06 Japan 2-1973, "Flame Resistant Polyamide . . . ", JA7303907.
Derwent Abst. 04443W/03 Teijin (Japan J49035617), Apr. 1974.

*Primary Examiner*—Melvyn I. Marquis
*Assistant Examiner*—Herbert J. Lilling
*Attorney, Agent, or Firm*—Lockwood, Dewey, Alex & Cummings

[57] ABSTRACT

Adhesives and coatings, especially two-component epoxy laminating adhesives, are prepared so as to be flame-resistant in the so-called part B or polyamide component thereof by including in that component a chlorinated hydrocarbon solvent together with an adduct of a polyamide and an aromatic hydroxy or epoxy compound. By this approach, the amine is tied up and is rendered resistant to premature reaction with the chlorinated hydrocarbon solvent within the part B component, which premature reaction would lead to the formation of undesirable crystals within the part B component and reduce its pot life. When the part B component is blended with an epoxy-containing part B component, the polyamine adduct gradually disassociates in order to free the polyamine to catalyze setting of the two-component system, particularly the epoxy resin of the part A component.

23 Claims, No Drawings

STABILIZATION OF EPOXY SYSTEMS IN NON-FLAMMABLE SOLVENTS

BACKGROUND AND DESCRIPTION OF THE INVENTION

This invention relates generally to improved adhesive and coating formulations, especially to part B components thereof that have the combined properties of flame resistance and a long pot life. More particularly, this invention includes a part B component in which the polyamine catalyst is tied up with an aromatic hydroxy or epoxy compound to form an adduct that is resistant to reaction with a flame-resistant chlorinated hydrocarbon solvent also included in the part B component. Such formulations are particularly suitable for use as laminating adhesion which have a pot life that is acceptable for use within commercial laminating machinery.

Epoxy resins have long been known for their excellent adhesion to a large variety of surfaces and have gained wide acceptance in various industries due to their superior cohesive strength, low shrinkage, creep resistance, curability at room temperatures, resistance to failure within wide temperature ranges, and excellent adhesion to cellulosic materials such as masonite, plywood and particle board as well as to non-cellulosic materials such as metals, glass, ceramics, vinyls and plastic film.

Typically, epoxy systems are composed of a so-called part A component containing an epoxy compound or resin, which is stored separately from the so-called part B component that includes a catalyst, usually a polyamine, for the epoxy material. Often, it is desired for ease of blending and application by machinery, that both the part A component and the part B component be solvent systems, and typically the solvents used are not flame resistant, including esters, ketones and aromatic hydrocarbons such as xylene. As is the case with any system incorporating solvents that are not flame resistant, such systems are looked upon with disfavor by governmental agencies and by insurance underwriters, leading to close administrative scrutiny and higher insurance costs. Recently, some of these concerns have lessened by the use of flame-resistant solvents, most notably halogenated hydrocarbon solvents wherever possible within adhesive formulations.

Halogenated hydrocarbon solvents have been incorporated into part A components of commercial epoxy adhesives, but they have not been successfully utilized within the part B component of commercial epoxy adhesives. One of the primary reasons why hydrocarbon solvents are not used within commercial-scale part B components is the undesirable "lumping" that develops within part B components having a halogenated hydrocarbon solvent. It has been discovered and it is believed that this lumping is due to the gradual formation of a crystalized reaction product and/or of an oil reaction product between the polyamine of the part B component and the halogenated hydrocarbon solvent, which oil has been observed to crystalize when subjected to agitation such as that developed in the pots of commercial adhesive applicators, such crystals being believed to be water-soluble polyamine hydrohalide salts. Irrespective of when or how these types of crystals are formed, they render the part B component unacceptable for commercial and industrial use.

Accordingly, in the present state of the commercial epoxy adhesive art, so-called flame resistant formulations are typically in reality formulations that are flame-resistant only with respect to the part A component and not the part B component also, and it is still customary to utilize a part B solvent that is not flame resistant and which does not fully alleviate the concerns attendant to the use of such solvents, especially within an environment such as that of a commercial laminating facility.

It has now been discovered that a halogenated hydrocarbon solvent can be the part B solvent, and these lumping problems can be elminated for as long a time as is required for an acceptable commercial pot life by forming a complex or adduct between the polyamine resin and an aromatic hydroxy or epoxy compound. The flame-resistant part B component of this invention is formulated to include a flame-resistant halogenated hydrocarbon solvent and an aromatic hydroxy or epoxy compound which forms an adduct with the polyamine resin to render the polyamine resistant to undesirable reaction with the flame-resistant solvent so as to prevent lumping over a substantial period of time to thereby extend the pot life of the part B component. Moreover, such adduct decomposes gradually over time when this part B component is mixed with the part A component, whereby the part B amine is free to catalyze the part A epoxy compound or resin in order to proceed with curing and setting of the two-component adhesive after it is applied to the surfaces to be bonded together and the solvents within the system evaporate off.

Accordingly, an object of the present invention is to provide improvements in multi-component adhesive and coating systems.

Another object of the present invention is an improved flame-resistant laminating adhesive composition, the method of preparation thereof, and the method of use thereof.

Another object of this invention is to provide a part B component of an adhesive formulation that includes a flame-resistant solvent.

Another object of the present invention is an improved part B component of a multi-component adhesive system, its method of preparation and use, which part B component includes a solvent that is flame-resistant and which component is resistant to lumping for time periods up to and exceeding six months.

Another object of this invention is an improved two-component, solvent-based laminating adhesive that includes no significant amounts of solvent that is not flame-resistant.

Another object of the present invention is an improved two-component, solvent-based laminating adhesive and its method of production and use in which the solvent in both the part A component and the part B component is a halogenated hydrocarbon.

Another object of the present invention is to provide an improved adhesive composition for laminating a cellulosic ply to a non-cellulosic ply.

Another object of the present invention is an improved composition, method and use thereof in which the polyamine within the part B component thereof is complexed with an aromatic hydroxy or epoxy compound in order to render the polyamine resistant to reaction with a chlorinated hydrocarbon solvent within the part B component.

Another object of this invention is the provision of an improved part B component having a flame-retardant solvent and being resistant to lumping during extended applicator pot storage and which, when blended with a part A epoxy component, rapidly and effectively reacts therewith to bring about curing of the two-component system.

Another object of the present invention is an improved adhesive formulation, method of preparation and use thereof, in which the polyamine within the part B component is complexed for resistance to reaction with a halogenated hydrocarbon solvent and is gradually uncomplexed when combined with the part A component, whereby the polyamine catalyzes the epoxy material within the part A component but does not react significantly with the halogenated hydrocarbon solvent.

These and other objects of this invention will be apparent from the following detailed description thereof.

The stabilized flame-resistant part B component according to this invention includes a polyamide reactive resin, a flame-resistant halogenated hydrocarbon solvent, and a complex or adduct of a polyamine and an aromatic hydroxy or epoxy compound. When such a part B component is combined with a part A component having an epoxy-containing reactive resin and a solvent, the part A component and the part B component combine to form a two-component composition that is especially suitable for laminating adhesive uses and that includes flame-resistant solvents, and each component of which is posessive of a pot life that is acceptable for use in commercial adhesive or coating application machinery. Both the part A component and the part B component may also include other various fillers and additives as optional ingredients that provide certain advantages to commercially marketed products.

With particular reference to the part B component, the reactive resin thereof is a polyamide material of the type typically included within a part B component such as those polyamides that are produced from diacids and diamines and which often exhibit amine groups as well as a preponderance of amide groups, which polyamides are usually viscous, brown liquids. Examples of known part B component polyamides include those described in U.S. Pat. No. 2,450,940, incorporated by reference hereinto, Versamid 100, Versamid 115, Versamid 125 and Versamid 140, (Versamid is a trade mark of General Mills, Inc.), D.E.H. 11, D.E.H. 12 and D.E.H. 14 (D.E.H. is a trade mark of Dow Chemical Corporation), Epon V-15, Epon V-25 and Epon V-40, (Epon is a trade mark of Shell Corporation), and Epicure 8515 and Epicure 8525, (Epicure is a trade mark of Celanese Corporation). These polyamide reactive resins react with the part A component reactive resins during the process of setting the two-component adhesives. They are included within the part B component in an amount between about 10 and about 40 weight percent, preferably between about 15 and 30 weight percent, based on the total weight of the part B component.

In order to provide the part B component as a solvent-based system for uses where low viscosity, pourability and/or flowability are important, such as when the adhesive is used within commercial-scale laminating machinery, while at the same time avoiding the use of solvents that are not flame-resistant, halogenated hydrocarbon solvents are included within the part B component. Typically these will be chlorinated hydrocarbon solvents, preferably one or more of methylene chloride, 1,1,1-trichloroethane and trichloroethylene (1,1,2-trichloroethylene), present in an amount between about 10 and about 90 weight percent, preferably between about 15 and about 40 weight percent, based on the total weight of the part B component.

The stabilized amine catalyst in accordance with this invention is either an adduct formed between an amine and an acidic alcohol such as an aromatic hydroxy or epoxy compound or a previously formed compound having amine and acidic alcohol groups. Adducts formed between amines and aromatic hydroxy compounds are more in the nature of complexes than of addition products or compounds, and adducts formed between amines and aromatic epoxy compounds as well as such previously formed compounds are more in the nature of addition products or compounds than complexes. Any such complexes, addition products and compounds are referred to herein as adducts. These adducts are included in amounts between about 2 and about 40 weight percent. When a previously formed compound is used, the amount thereof included should be greater than when a complex is used. Preferably, the amount of the adduct is between about 3 and about 30 weight percent, based upon the total weight of the part B component.

Referring specifically to the compounds used to form the polyamine complex, the amine portion thereof includes primary, secondary or tertiary amines that catalyze epoxy compounds or resins such as those normally found within part A components of two-component epoxy system. Representative of the polyamines are the ethylene amines, the propylene amines and butylene amines, heterocyclic amines and polyamines, bycyclic amines and polyamines, aliphatic amines and polyamines, cycloaliphatic amines and polyamines, alkanol and hydroxy aliphatic amines, and aromatic amines such as meta-xylene diamine. Preferred are the ethylene amines, including ethylenediamine, diethylenetriamine, triethylenetetramine, and tetraethylenepentamine. The amine will typically be added to the part B component at an amount between about 1 and about 20 weight percent, preferably between about 3 and about 12 weight percent, based upon the total weight of the part B component.

The aromatic hydroxy group included within the stabilized catalyst according to this invention includes phenol and substituted phenols represented by the formula:

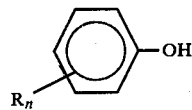

wherein n is an integer of from 1 to 5 and R is hydrogen or any noninterfering group, including alkyl or carboxyl groups of from 1 to 20 carbon atoms. Included within this formula are nonyl phenol and ortho-hydroxy benzoic acid (salicyclic acid).

Aromatic epoxy compounds useful for forming the amine adduct are epoxy resins of the type typically included within part A components, although the quantities used as a complex former of this part B component should be lower than those amounts typically used in part A components such that there is an excess of polyamine within the part B component in order to form the amine-terminated polyepoxide resin complexes rather than the cross-linked cured products formed when the part A component is combined with the part B component. Such aromatic epoxy compounds include those based on bisphenol-A and epichlorohydrin, especially the shorter chain, lower viscosity resins that are typically liquid at room temperature, having an epoxy equivalent weight of between about 170 and 375, preferably between about 175 and 210, a viscosity between about 500 and 20,000 centipoises at 25° C., and an average of between about 1.7 and 2.0 epoxide groups per molecule. Other suitable epoxy compounds include epichlorohydrin with a novolac resin obtained by condensing phenol and formaldehyde under acidic conditions and at a formaldehyde to phenol molar ratio of less than one, typically between about 0.5 to about 0.8. Usually, these epoxy compounds will be diepoxides, having two terminal epoxy groups and will have a molecular weight on the order of 350 to 400. As a class, these aromatic epoxy compounds are not as effective for purposes of this invention as is phenol and its derivatives. It can be expected that, in order to achieve a desired pot life, more aromatic epoxy would be needed relative to the amount of aromatic hydroxy needed.

The aromatic hydroxy or epoxy compound will typically be added to the part B component at an amount between about 0.5 and about 15 weight percent, based upon the total weight of the part B component. Amounts in excess thereof, generally speaking, should be avoided; otherwise, the net effect can well be an acceleration of cure. The amount at which the net effect brought about by the inclusion of the aromatic hydroxy or epoxy compound will be an acceleration of cure will, of course, depend somewhat upon the particular compounds involved, and 15 weight percent is not necessarily a precise maximum line of demarcation in this regard.

Various fillers and other additives can be included within the part B component in varying quantities, typically up to a total amount of about 70 weight percent, preferably no more than about 50 weight percent. Included within this general class are fillers and thickeners such as calcium carbonate, silicon dioxide and the like, antioxidants, polyurethane elastomers, and dyes or pigments as desired. Such additives are typically included for purposes usually associated therewith. For example, a pigment is often included as an identifier of the part B component and to distinguish it from the part A component and to visualize the proper mix of the part A and part B components.

The part A component will include one or more reactive resins, one of which is an epoxy resin, including the aromatic resins that can be included within the part B component, usually in amounts between about 20 and about 80 weight percent, preferably between about 25 and about 50 weight percent, based upon the total weight of the part A component. It is often desirable to also include a polyurethane reactive resin to impart immediate tackifying properties to the adhesive in order to provide an initial tack to maintain the surfaces being bonded in substantially stable location with respect to each other until cure and setting of the epoxy resin has progressed substantially. A typical polyurethane resin suitable for this purpose would be present in a quantity between about 1 and about 15 weight percent, based upon the total weight of the part A component.

Any suitable solvents may be utilized. When flame resistance is also desired in the part A component, the halogenated hydrocarbon solvents suitable for use within the part B component may also be used in the part A component in amounts typically ranging between about 10 and about 80 weight percent, preferably between about 15 and about 40 weight percent, based upon the total weight of the part A component. Similarly, any of the various available fillers or other additives may be included within the part A component, including those suitable for use within the part B component and at the same general percentages as specified for the part B component.

When proceeding with the method in accordance with this invention, a part B component is prepared by forming an amine complex or adduct and combining same with a flame-resistant solvent. While the polyamine adduct can be formed prior to its addition to the solvent, it is preferred that the complex be formed in situ within the solvent by adding both the aromatic hydroxy or epoxy compound and the amine catalyst directly to the solvent, preferably in that order. By this method, a complex is formed that is resistant to reaction with the flame-resistant solvent and the hydrohalide acid usually associated therewith. Such complexes have been observed during infrared analyses and have been found to have equilibrium constants from 150 to 10,000.

The polyamide and any fillers or other additives to be included within the part B component will also be added to the solvent, and additional solvent may then be added to adjust the viscosity as desired. It is generally preferred that the polyamide and the additives are combined with the part B solvent after the amine and the aromatic hydroxy or epoxy compound are added to the solvent.

After the part B component is formulated, it is suitable for filling into commercial laminating machinery in association with an appropriate laminating component for the purpose of adhering laminate plies together, including the formation of laminates having a cellulosic ply or plies such as masonite, plywood and particle board, and having a non-cellulosic ply or plies such as metals, vinyl and other plastic films, as well as laminates of non-cellulosic plies to non-cellulosic plies.

The following examples are offered to illustrate the various aspects of this invention and the properties realized thereby.

EXAMPLE I

A two-part laminating adhesive composition was prepared in typical part A and part B component fashion, with the part A formulation being typical of such components: 4 weight percent of a polyurethane elastomer resin and 36 weight percent of an epoxy resin as the reactive resins, together with 36 weight percent of calcium carbonate filler and 24 weight percent of methylene chloride flame-resistant solvent. This part A component was found to react satisfactorily with and provide an acceptable bond when combined with the following part B formulation and applied according to conventional procedures in order to form a laminate bond, such part B component including: 20 weight percent of polyamide resin, 7 weight percent of triethylenetetramine catalyst, and 5 weight percent of an epoxy resin added to 24 weight percent of 1,1,1-trichloroethane flame-resistant solvent, together with 44 weight percent of calcium carbonate and silicon dioxide fillers and pigment.

Prior to combining with the part A component, this part B component had a viscosity of 24 poises at 77° F. at 20 RPM (No. 4 spindle), and no substantial oil or crystal formation was observed after storage for about three months. When the same formation was prepared but from which the epoxy resin was omitted, an oil appeared in three days and the oil crystalized with agitation of this unstabilized part B formulation.

EXAMPLE II

A part B component that satisfactorily cured with a part A component such as that of Example I was formulated to include: 20 weight percent of a polyamide resin, 5.5 weight percent of triethylenetetramine and 11 weight percent nonyl phenol added with 42.5 weight percent fillers and pigment to 21 weight percent of 1,1,1-trichloroethane flame-resistant solvent. The nonyl phenol was added first to the solvent, followed by the polyamide resin, upon which exothermic heating was observed. This part B formation had a viscosity measured as 31.5 poises at 77° F., and no oil or crystal formation was observed therein after three months, while a substantially identical formulation from which the nonyl phenol was omitted developed a crystal-forming oil in less than three days.

EXAMPLE III

To 25.5 weight percent of 1,1,1-trichloroethane were added 22 weight percent of a polyamide resin, 5 weight percent of triethylenetetramine, 1 weight percent of salicyclic acid, and a total of 46.5 weight percent of calcium carbonate filler, silicon dioxide filler and blue pigment to prepare a part B flame-resistant laminating adhesive component having a viscosity of 32.5 poises at 77° F. and which is resistant to oil and crystal formation.

EXAMPLE IV

Phenol, about 5 weight percent, was used as the complex or adduct former in a part B laminating adhesive formulation further including 21 weight percent of polyamide resin, 5 weight percent of triethylenetetramine polyamine, 25 weight percent of 1,1,1-trichloroethane solvent, and 44 weight percent of fillers, this formulation having a good pot life and a viscosity of 31 poises at 77° F.

EXAMPLE V

Another part B formulation was prepared that was substantially identical to and exhibited substantially the same properties as Example IV, except it included 7 weight percent of triethylenetetramine, 5 weight percent of phenol, 20.5 weight percent of the polyamide resin, 24.5 weight percent of the solvent, and 43 weight percent of the fillers, the formulation having a viscosity of 30 poises.

EXAMPLE VI

An epoxidized oil, 5 weight percent, was incorporated into a part B component as the complex or adduct former, the component also including 23 weight percent of 1,1,1-trichloroethane, 20.5 weight percent of polyamide, 6.5 weight percent of triethylenetetramine, and 45 weight percent of fillers, the component having a viscosity of 31.5 poises at 77° F.

EXAMPLE VII

Comparative testing was carried out on one part B formulation containing 100 grams of methylene chloride flame-resistant solvent and 5 grams of triethylenetetramine and another part B formulation having 100 grams of methylene chloride, 5 grams of triethylenetetramine and 5 grams of phenol. Very dense crystals formed overnight in the former formulation and did not form until after 42 hours in the latter one and were much less dense. A further formulation including 100 grams of methylene chloride, 5 grams of triethylenetetramine and 10 grams of phenol showed first evidence of crystal formation in the fifth day, and only a few scattered crystals were formed after three weeks.

EXAMPLE VIII

Crystal forming oil was formed overnight in a part B component including 100 grams of trichloroethylene and 5 grams of triethylenetetramine, while no oil layer was observed until after 7 days for a part B component having 100 grams of trichloroethylene, 5 grams of triethylenetetramine and 5 grams of phenol.

EXAMPLE IX

Part B components according to this invention are formed to include 100 parts by weight of 1,1,1-trichloroethane, 20 parts of phenol, 80 parts of polyamide resin, and 20 parts of triethylenetetramine, or 12.5 parts by weight of ethylenediamine, or 17 parts by weight of diethylenetriamine, or 22 parts by weight of tetraethylenepentamine.

EXAMPLE X

Various tests were run to illustrate the effectiveness or formulations in accordance with this invention to remain stable over extended periods of time and thus exhibit a pot life that is acceptable for use in commercial laminating machines. Several part B formulations were analyzed by acid titration in order to determine their amine values which indicate the extent that the amine catalyst had prematurely reacted with the halogenated solvent of the part B component rather than be available as a catalyst for the epoxy resin of a part A component. The acid titration was carried out according to the analytical procedure reported in J. Fitz, Analytical Chemistry, 22, pages 1028-1029 (1950), with hydrochloric acid being used as the titration agent.

These amine value data are reported in Table 1 wherein the "Flam" formulation was a "control" part B composition having a flammable, non-halogenated solvent and for which premature reaction is not a problem. The "Non-Flam" formulation included 1,1,1-trichloroethane as its solvent so as to render it non-flammable, but it was not in accordance with the present invention in that it did not include an aromatic hydroxy or epoxy compound. Formulations A through G were the "Non-Flam" formulation to which were added an aromatic hydroxy or epoxy compound as follows: formulation A, 2 parts by weight of an epoxy resin; formulation B, 5 parts by weight of an epoxy resin; formulation C, 2 parts by weight of nonyl phenol; formulation D, 5 parts by weight of nonyl phenol; formulation E, 2 parts by weight of phenol; formulation F, 1 part by weight of nonyl phenol. All of these formulations also included a polyamide and triethylenetetramine at concentrations according to this invention, and the parts by weight are based on the weight of a total adhesive system.

TABLE 1

| Time After Formulation | Flam. | Non-Flam. | A | B | C | D | E | F | G |
|---|---|---|---|---|---|---|---|---|---|
| Initial | 105.5 | 102.1 | 104.4 | 108.8 | 100.3 | 93.2 | 105.4 | 96.5 | 100.3 |
| 1 Week | 107.9 | — | 107.2 | — | 102.8 | 97.0 | 100.7 | 97.0 | 102.1 |
| 2 Weeks | 106.9 | — | — | 108.9 | — | 98.2 | 99.5 | 96.4 | 99.6 |
| 3 Weeks | — | — | 105.0 | 108.0 | — | 95.9 | 101.4 | 97.1 | 99.6 |
| 4 Weeks | — | — | 106.0 | 108.8 | 99.5 | 95.1 | 99.2 | 97.0 | 100.3 |
| 5 Weeks | 108.9 | — | 105.6 | 107.0 | — | 96.7 | 100.5 | 90.8 | — |
| 6 Weeks | 106.8 | 95.7 | 103.9 | 105.5 | — | 92.9 | 99.7 | 94.5 | 97.5 |
| 7 Weeks | 108.9 | 93.9 | 102.0 | 108.1 | 101.4 | 94.8 | 96.9 | 92.2 | 98.3 |
| 8 Weeks | — | — | 104.7 | 107.3 | 101.4 | 92.6 | 97.6 | 94.2 | 96.6 |
| 9 Weeks | — | — | 100.5 | 105.9 | 100.0 | 96.7 | 98.7 | 92.8 | 95.7 |
| 10 Weeks | — | — | — | 104.3 | — | — | 92.5 | 88.3 | — |
| 11 Weeks | — | — | 101.9 | — | 102.7 | 96.6 | 96.0 | — | 100.5 |
| 12 Weeks | — | — | — | 100.8 | — | — | — | — | 97.5 |
| 13 Weeks | — | — | 100.5 | 106.6 | 102.3 | 94.9 | — | — | 95.9 |
| 14 Weeks | 112.9 | — | 100.3 | 104.6 | — | — | — | — | — |
| 15 Weeks | — | 84.7 | 100.2 | 104.7 | — | — | — | — | — |
| 20 Weeks | — | 75.5 | — | — | — | — | — | — | — |
| 43 Weeks | — | 59.0 | — | — | — | — | — | — | — |

EXAMPLE XI

Additional tests were run along the lines of those reported in Example X, except the titration was effected with perchloric acid, each formulation included substantially the same polyamide as Example X, and no triethylenetetramine was included in any of the formulations. Results of these tests are provided in Table 2 wherein the "Control" formulation included no solvent, the "Flam" formulation was a further control having 25 parts by weight xylene as the solvent (flammable), the "Non-Flam" formulation having 25 parts by weight of 1,1,1-trichloroethane but no aromatic hydroxy or epoxy compound according to this invention, while each of formulations J through O included 25 parts by weight of 1,1,1-trichloroethane together with phenol in the following concentrations: formulation J, 0.25 parts by weight; formulation K, 1.25 parts by weight; formulation L, 2.5 parts by weight; formulation M, 3.75 parts by weight; formulation N, 5.0 parts by weight; and formulation O, 10.0 parts by weight, the parts by weight being based on the weight of a total adhesive system.

TABLE 2

| Time After Formlation | Control | Flam. | Non-Flam. | J | K | L | M | N | O |
|---|---|---|---|---|---|---|---|---|---|
| Initial | — | 333 | 338 | — | — | — | — | — | — |
| 1 Day | 328 | — | — | 332 | 334 | 338 | 333 | 330 | 333 |
| 2 Days | — | — | 330 | — | — | — | — | — | — |
| 5 Days | 329 | — | — | 334 | 332 | 331 | 335 | 334 | 335 |
| 6 Days | — | 332 | 330 | — | — | — | — | — | — |
| 9 Days | 329 | — | — | 330 | 332 | 335 | 335 | 335 | 337 |
| 10 Days | — | 323 | 332 | — | — | — | — | — | — |
| 16 Days | 328 | — | — | 321 | 321 | 329 | 336 | 329 | 332 |
| 17 Days | — | 317 | 328 | — | — | — | — | — | — |
| | 325 | | | | | | | | |
| 23 Days | 330* | 318 | 317 | 318 | 319 | 320 | 325 | 326 | 331 |
| 30 Days | 324* | 316 | 318 | 319 | 321 | 321 | 333 | 330 | 334 |
| 48 Days | 325* | 311 | 311 | 309 | 316 | 322 | 330 | 326 | 331 |
| 120 Days | 327* | 320 | 298 | 304 | 307 | 312 | 317 | 323 | 331 |

*Fresh control of the same polyamide.

While in the foregoing specification certain embodiments and examples of the invention have been described in detail, it will be appreciated that modifications and variations therefrom will be apparent to those skilled in the art; accordingly, this invention is to be limited only by the scope of the appended claims.

We claim:

1. A flame-resistant laminating adhesive composition comprising:
   a part A component including an epoxy containing reactive resin and a flame-resistant solvent; and
   a part B component including a polyamide reactive resin, a flame-resistant halogenated hydrocarbon solvent, and an adduct of an amine and an aromatic hydroxy compound or epoxy resin, said amine being a catalyst for said epoxy containing reactive resin, and said adduct being resistant to reaction of said amine with said halogenated hydrocarbon solvent.

2. The flame-resistant laminating adhesive composition of claim 1, wherein said polyamide exhibits amine groups as well as amide groups.

3. The flame-resistant laminating adhesive composition of claim 1, wherein said part B component includes between about 10 and about 40 weight percent of said polyamide, between about 10 and about 90 weight percent of said flame-resistant solvent, and between about 2 and about 40 weight percent of said amine adduct.

4. The flame-resistant laminating adhesive composition of claim 1, wherein said part B flame-resistant solvent is selected from the group consisting of methylene chloride, 1,1,1-trichloroethane, and trichloroethylene, and combinations thereof.

5. The flame-resistant laminating adhesive composition of claim 1, wherein said amine adduct is a complex formed between said amine and said aromatic hydroxy compound.

6. The flame-resistant laminating adhesive composition of claim 1, wherein said amine adduct is a complex formed between a polyamine and a phenol or substituted phenol of the formula

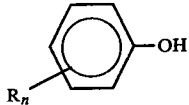

wherein n is from 1 to 5, and R is hydrogen or a non-interfering alkyl or carboxyl group of from 1 to 20 carbon atoms.

7. The flame-resistant laminating adhesive composition of claim 1, wherein said aromatic hydroxy compound is selected from the group consisting of phenol, nonyl phenol, salicyclic acid, and combinations thereof.

8. The flame-resistant laminating adhesive composition of claim 1, wherein said amine is an ethylene amine selected from the group consisting of ethylenediamine, diethylenetriamine, triethylenetetramine, tetraethylenepentamine, and combinations thereof.

9. The flame-resistant laminating adhesive composition of claim 1, wherein said amine is added to the part B component at a concentration between about 1 and about 20 weight percent, based on the total weight of the part B component.

10. The flame-resistant laminating adhesive composition of claim 1, wherein said aromatic hydroxy compound or epoxy resin is added to the part B component at a concentration between about 0.5 and about 15 weight percent, based on the weight of the part B component.

11. The flame-resistant laminating adhesive composition of claim 1, further including up to about 70 weight percent of a filler, based on the weight of the part B component.

12. The flame-resistant laminating adhesive composition of claim 1, wherein said part B component further includes a polyurethane resin.

13. The flame-resistant laminating adhesive composition of claim 1, wherein said part B component further includes a dye or pigment.

14. The flame-resistant laminating adhesive composition of claim 1, wherein said part A component includes between about 20 and 80 weight percent of said epoxy-containing reactive resin.

15. The flame-resistant laminating adhesive composition of claim 1, wherein said part A component further includes a polyurethane resin.

16. A flame-resistant part B component of a multi-component epoxy system composition, comprising:
a polyamide reactive resin, a flame-resistant halogenated hydrocarbon solvent, and an adduct of an amine and an aromatic hydroxy compound or epoxy resin, said amine being a catalyst for an epoxy containing reactive resin, and said adduct being resistant to reaction of said amine with said halogenated hydrocarbon solvent.

17. The flame-resistant part B component of claim 16, wherein said component includes between about 10 and about 40 weight percent of said polyamide, between about 10 and about 90 weight percent of said flame-resistant solvent, and between about 2 and about 40 weight percent of said amine adduct.

18. The flame-resistant part B component of claim 16, wherein said flame-resistant solvent is selected from the group consisting of methylene chloride, 1,1,1-trichloroethane, and trichloroethylene, and combinations thereof.

19. The flame-resistant part B component of claim 16, wherein said amine adduct is a complex of said amine and said aromatic hydroxy compound.

20. The flame-resistant part B component of claim 16, wherein said amine adduct is a complex formed between a polyamine and a phenol or substituted phenol of the formula

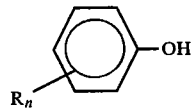

wherein n is from 1 to 5, and R is hydrogen or a non-interfering alkyl or carboxyl group of from 1 to 20 carbon atoms.

21. The flame-resistant part B component of claim 16, wherein said aromatic hydroxy compound is selected from the group consisting of phenol, nonyl phenol, salicylic acid, and combinations thereof.

22. The flame-resistant part B component of claim 16, wherein said amine is an ethylene amine selected from the group consisting of ethylenediamine, diethylenetriamine, triethylenetetramine, tetraethylenepentamine, and combinations thereof.

23. The flame-resistant part B component of claim 16, wherein said aromatic hydroxy compound or epoxy resin is at a concentration between about 0.5 and about 15 weight percent, based on the total weight thereof.

* * * * *